US012094395B2

(12) United States Patent
Feng et al.

(10) Patent No.: US 12,094,395 B2
(45) Date of Patent: Sep. 17, 2024

(54) ELECTRONIC DEVICE

(71) Applicant: InnoLux Corporation, Miao-Li County (TW)

(72) Inventors: Yu-Hsin Feng, Miao-Li County (TW); Chong-De Wang, Miao-Li County (TW); Yung-Hsin Chang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/461,753

(22) Filed: Sep. 6, 2023

(65) Prior Publication Data

US 2024/0119888 A1 Apr. 11, 2024

(30) Foreign Application Priority Data

Oct. 10, 2022 (CN) ......................... 202211235169.6

(51) Int. Cl.
*G09G 3/20* (2006.01)

(52) U.S. Cl.
CPC ......... *G09G 3/2096* (2013.01); *G09G 3/2007* (2013.01); *G09G 2310/027* (2013.01); *G09G 2310/0291* (2013.01); *G09G 2320/0673* (2013.01); *G09G 2330/028* (2013.01)

(58) Field of Classification Search
None
See application file for complete search history.

(56) References Cited

U.S. PATENT DOCUMENTS

| | | | | | |
|---|---|---|---|---|---|
| 8,705,135 | B2 * | 4/2014 | Furihata | G09G 3/2007 | 358/521 |
| 2002/0060656 | A1 * | 5/2002 | Okuzono | G09G 3/3611 | 345/88 |
| 2003/0001810 | A1 * | 1/2003 | Yamaguchi | G09G 3/3648 | 345/87 |
| 2005/0110796 | A1 * | 5/2005 | Flowers | G09G 3/2025 | 345/589 |
| 2007/0285693 | A1 * | 12/2007 | Kim | G09G 3/3688 | 358/1.9 |

FOREIGN PATENT DOCUMENTS

WO WO-2005039167 A2 * 4/2005 ........... G09G 3/2025

* cited by examiner

*Primary Examiner* — Dorothy Harris
(74) *Attorney, Agent, or Firm* — McClure, Qualey & Rodack, LLP

(57) ABSTRACT

An electronic device includes a gamma data source, a signal receiving circuit, a buffer circuit, a counter, a multiplexer, and a gamma processing unit. The signal receiving circuit receives source data, and correspondingly generates a grayscale value. The buffer circuit electrically couples the signal receiving circuit and stores the grayscale value. The counter receives a system clock signal to generate a sequence number. The multiplexer electrically couples the counter and the gamma data source. The multiplexer receives the sequence number. The multiplexer outputs a bit message corresponding to the sequence number in the gamma data source. The gamma processing unit electrically couples the multiplexer and the buffer circuit. The gamma processing unit receives the bit message from the multiplexer. The gamma processing unit receives the grayscale value from the buffer circuit. The gamma processing unit outputs a bit value corresponding to the grayscale value in the bit message.

20 Claims, 3 Drawing Sheets

ELECTRONIC DEVICE

CROSS REFERENCE TO RELATED APPLICATIONS

This application claims the benefit of China Application 202211235169.6, filed on Oct. 10, 2022, the entirety of which is incorporated by reference herein.

BACKGROUND OF THE DISCLOSURE

Field of the Invention

The present invention relates to an electronic device, and, in particular, to an electronic device for saving storage space for grayscale values.

Description of the Related Art

It is currently known that display devices and light-emitting devices use gamma voltage to control the brightness and other characteristics of the liquid-crystal components therein.

However, in order to generate the accumulated gamma voltage, a large amount of storage space is required, so a circuit design capable of saving space is required.

BRIEF SUMMARY OF THE DISCLOSURE

An embodiment of the present disclosure provides an electronic device. The electronic device includes a gamma data source, a signal receiving circuit, a buffer circuit, a counter, a multiplexer, and a gamma processing unit. The signal receiving circuit receives source data, and correspondingly generates a grayscale value. The buffer circuit is electrically coupled to the signal receiving circuit and stores the grayscale value. The counter receives a system clock signal to generate a sequence number. The multiplexer is electrically coupled to the counter and the gamma data source. The multiplexer receives the sequence number. The multiplexer outputs a bit message corresponding to the sequence number in the gamma data source. The gamma processing unit is electrically coupled to the multiplexer and the buffer circuit. The gamma processing unit receives the bit message from the multiplexer. The gamma processing unit receives the grayscale value from the buffer circuit. The gamma processing unit outputs a bit value corresponding to the grayscale value in the bit message.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Figure 1:
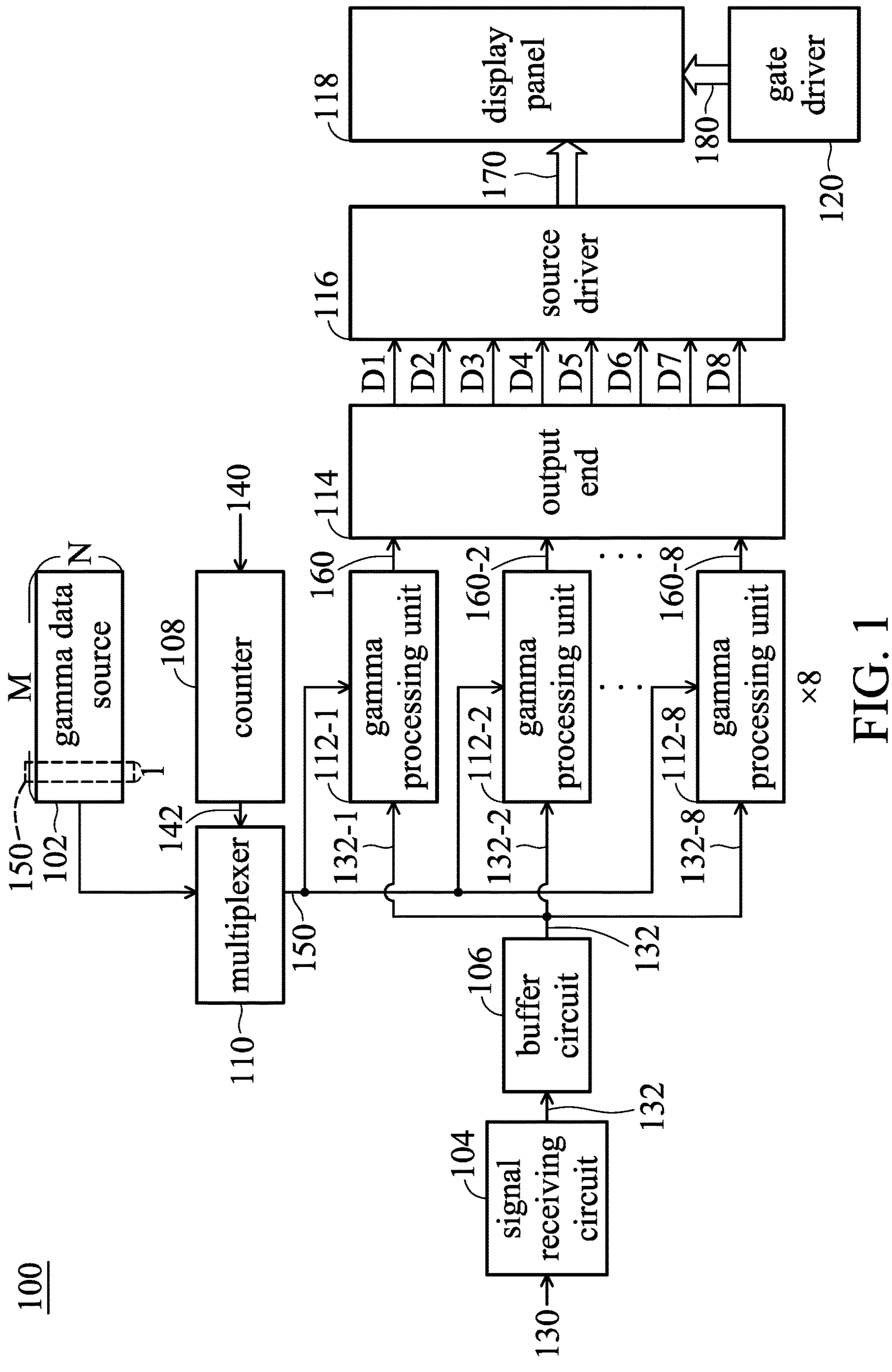
FIG. 1 is a schematic diagram of an electronic device 100 in accordance with some embodiments of the present disclosure.

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present disclosure are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present disclosure.

In the present disclosure, the electronic device in FIG. 1 in the present disclosure may include a display device, a backlight device, an antenna device, a sensing device, or a splicing device, etc., but is not limited thereto. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device for sensing capacitance, light, heat, or ultrasonic waves, but is not limited thereto. The electronic components may include passive and active components, such as capacitors, resistors, inductors, diodes, transistors, and the like. The diodes may include light-emitting diodes or photodiodes. The light-emitting diode may include organic light-emitting diode (OLED), inorganic light-emitting diode, micro-LED, mini-LED, quantum dot light-emitting diode (QLED, QDLED), other suitable materials or a combination of the above materials, but is not limited thereto. The splicing device may be, for example, a splicing display device or a splicing antenna device, but is not limited thereto. In addition, the display device in the electronic device may be a color display device or a monochrome display device, and the shape of the electronic device may be rectangular, circular, polygonal, a shape with curved edges, or other suitable shapes. In addition, the electronic device described below uses, as an example, the sensing of a touch through an embedded touch device, but the touch-sensing method is not limited thereto, and another suitable touch-sensing method can be used provided that it meets all requirements.

FIG. 1 is a schematic diagram of an electronic device 100 in accordance with some embodiments of the present disclosure. As shown in FIG. 1, the electronic device 100 includes a gamma data source 102, a signal receiving circuit 104, a buffer circuit 106, a counter 108, a multiplexer 110, gamma processing units 112-1, 112-2, . . . , 112-8, an output end 114, a source driver 116, a display panel 118, and a gate driver 120. The display panel 118 may be a reflective display panel or an electronic paper display panel, but the present disclosure is not limited thereto. In some embodiments, the gamma data source 102 includes a matrix having M columns and N rows, M and N are natural numbers greater than 1. In some embodiments, M is 64 and N is 16, but the present disclosure is not limited thereto. In other words, in some embodiments, the gamma data source 102 may be a 64*16 matrix, but the present disclosure is not limited thereto. It is noted that, in this disclosure, respective row of the gamma data source 102 may correspond to different grayscale values, and respective row records a bit string corresponding to the grayscale value. Take the aforementioned gamma data source 102 (M=64, N=16) having a 64*16 matrix as an example, the gamma data source may correspond to 16 different grayscale values ($0^{th}$ grayscale to 15th grayscale), the bit string corresponding to respective grayscale value includes different numbers of bit combinations of 0 and 1, and respective bit in respective bit string represents the voltage effect that a pixel receives in a short period of time. Therefore, a bit string represents the length of time that the voltage effect is applied to a pixel within a specific display period. Take the reflective liquid crystal panel as an example, when the bit value is 0, it means that the pixel is subjected to a voltage, and the voltage effect may make the liquid crystal molecules in a reflective state, which can reflect the external light and make the pixel brightness higher. When the bit value is 1, it means that the pixel subjected to another voltage, and the voltage effect may make the liquid crystal molecules to rotate and tend to be in a penetrating state. The pixel brightness is low because the pixel cannot reflect external light. Therefore, in the above-mentioned gamma data source 102, the darkest $0^{th}$ grayscale corresponds to a bit string containing 64 bits values all equal to 1, which means that the pixel is always in the darker penetrating state during the display period corresponding to the bit string. The brightest $15^{th}$ grayscale corresponds to a bit string containing 64 bit values all equal to 0, which means that the pixel is always in the brighter reflective state during the display period corresponding to the bit string. In other words, the purpose of the gamma data source 102 is to convert the received grayscale values into the way for actually driving the pixels.

The signal receiving circuit 104 receives source data 130, generates a grayscale value 132 correspondingly, and sends the grayscale value 132 to the buffer circuit 106. In some embodiments, the source data 130 can be any type of image data. The grayscale value 132 can be represented by bits of 0 and 1, and correspond to an integer greater than or equal to 0 and less than N. In some embodiments of FIG. 1, the grayscale value 132 may correspond to 16 grayscale values (for example, the $0^{th}$ grayscale to the $15^{th}$ grayscale are respectively represented by 4 bits "0000" to "1111"), but the present disclosure is not limited thereto. The buffer circuit 106 stores the grayscale value 132. In some embodiments of FIG. 1, since the electronic device 100 includes 8 gamma processing units (such as gamma processing units 112-1, 112-2, . . . , 112-8) for simultaneously processing 8 pixels, the buffer circuit 106 sequentially stores grayscale values corresponding to the 8 pixels. In other words, since the grayscale value corresponding to a pixel can be represented by 4 bits, the buffer circuit 106 can store 32 (equal to 4*8) bits of data associated with the grayscale value. Although the electronic device 100 in FIG. 1 includes 8 gamma processing units 112-1 to 112-8, the present disclosure does not limited the number of gamma processing units. In some embodiments, the grayscale value 132 is the grayscale value of a single color (for example, red (R), green (G), and blue (B)). Therefore, in practical applications, the electronic device 100 has 3 sets of grayscale values 132 for respectively setting the grayscale values of red (R), green (G), and blue (B), but the number of sets of grayscale values 132 in the present disclosure is not limited thereto.

The counter 108 receives a system clock signal 140 to generate a sequence number 142. In some embodiments, the sequence number is an integer greater than or equal to 0 and less than M. In some embodiments of FIG. 1, the counter 108 may, for example, use 6 bits to represent a total of 64 sequence number changes from 0 to 63, but the present disclosure is not limited thereto. The multiplexer 110 is electrically coupled to the gamma data source 102 and the counter 108, receives the sequence number 142, and outputs a bit message 150 corresponding to the sequence number 142 in the gamma data source 102. In some embodiments, the bit message 150 is a matrix having one column and N rows, and N is a natural number greater than 1. In some embodiments of FIG. 1, the bit message may be a 1*16 matrix. The 1*16 matrix sequentially records the corresponding bit value of respective grayscale value in the bit message 150. For example, when the bit message 150 is $[1\ 0\ 0\ 0\ 0\ \ldots\ 0]^T$, the bit value corresponding to the $0^{th}$ grayscale is 1, the bit values corresponding to the $1^{st}$ to the $15^{th}$ grayscale are all 0, and so on.

Table 1 is a schematic table of the multiplexer 110 correspondingly outputting different bit messages 150 according to the sequence number 142 from the counter 108.

TABLE 1

| Grayscale value | Sequence number 142 = 0 | . . . | Sequence number 142 = 6 | . . . | Sequence number 142 = 9 | . . . | Sequence number 142 = 63 |
|---|---|---|---|---|---|---|---|
| 0 | 1 | . . . | 1 | . . . | 1 | . . . | 1 |
| 1 | 0 | . . . | 1 | . . . | 1 | . . . | 1 |
| 2 | 0 | . . . | 0 | . . . | 1 | . . . | 1 |
| 3 | 0 | . . . | 0 | . . . | 0 | . . . | 1 |
| . . . | . . . | . . . | . . . | . . . | . . . | . . . | . . . |
| 14 | 0 | . . . | 0 | . . . | 0 | . . . | 1 |
| 15 | 0 | . . . | 0 | . . . | 0 | . . . | 0 |

As shown in Table 1, when the sequence number 142 received by the multiplexer 110 from the counter 108 is equal to 0, the multiplexer 110 outputs the bit message 150 corresponding to the sequence number 142 being 1 in the gamma data source 102, such as $[1\ 0\ 0\ 0\ 0\ \ldots\ 0]^T$. The sequence number 142 received by the multiplexer 110 from the counter 108 is equal to 6, the multiplexer 110 outputs the bit message 150 corresponding to the sequence number 142 being 6 in the gamma data source 102, such as $[1\ 1\ 0\ 0\ 0\ \ldots\ 0]^T$. The sequence number 142 received by the multiplexer 110 from the counter 108 is equal to 9, the multiplexer 110 outputs the bit message 150 corresponding to the sequence number 142 being 9 in the gamma data source 102, such as $[1\ 1\ 1\ 0\ 0\ \ldots\ 0]^T$, and so on. As mentioned above, because the bit values in the bit string corresponding to the brightest $15^{th}$ grayscale are all 0, when the sequence number 142 received by the multiplexer 110 from the counter 108 is equal to 63, the multiplexer 110 outputs the bit message 150 corresponding to the sequence number 142 being 63 in the gamma data source 102, such as $[1\ 1\ 1\ 1\ 1\ \ldots\ 1\ 0]^T$. The content of the matrix in Table 1 is an example, and is not intended to limit the present disclosure.

In some embodiments of FIG. 1, since the electronic device 100 includes 8 gamma processing units (such as gamma processing units 112-1, 112-2, . . . , 112-8) for simultaneously processing 8 pixels, the grayscale value 132 (a total of 32 bits) output by the buffer circuit 106 is branched into 8 ways to form grayscale values 132-1, 132-2, . . . , 132-8. In other words, from the grayscale value 132-1 to the grayscale value 132-8, they all can be represented by 4 bits. Take the operation of the gamma processing unit 112-1 as an example. The gamma processing unit 112-1 receives the bit message 150 from the multiplexer 110 and the grayscale value 132-1 from the buffer circuit 106, and outputs a bit value 160 corresponding to the grayscale value 132-1 in the bit message 150. For example, refer to Table 1, it is assumed that the bit message 150 output by the multiplexer 110 is $[1\ 1\ 0\ 0\ 0\ \ldots\ 1\ 0]^T$, and the grayscale value 132-1 output by the buffer circuit 106 corresponds to the $0^{th}$ grayscale, the bit value 160 output by the gamma processing unit 112-1 is 1. Similarly, it is assumed that the bit message 150 output by the multiplexer 110 is $[11\ 0\ 0\ 0\ldots 0]^T$, but the grayscale value 132-1 output by the buffer circuit 106 corresponds to the $4^{th}$ grayscale, the bit value 160 output by the gamma processing unit 112-1 becomes 0.

Similarly, the gamma processing unit 112-2 receives the bit message 150 from the multiplexer 110 and the grayscale value 132-2 from the buffer circuit 106, and outputs a bit value 160 corresponding to the grayscale value 132-2 in the bit message 150-2, and so on. That is, the bit values 160, 160-2, . . . , and 160-8 can all be represented by 1 bit. In some embodiments, the output end 114 is electrically coupled to the gamma processing units 112-1, 112-2, . . . , 112-8, receives the bit values 160, 160-2, . . . , and 160-8 and correspondingly outputs bit values D1~D8. In some embodiments of FIG. 1, the bit value 160 is equal to the bit value D1, the bit value 160-2 is equal to the bit value D2, the bit value 160-3 is equal to the bit value D3, and so on. In the case that the gamma data source 102 is a 64*16 matrix, the gamma processing unit 112-1 needs to sequentially receive 64 pieces of bit message 150 from the multiplexer 110, and correspondingly output 64 pieces of bit value 160 to complete the processing of the gamma data source 102.

The source driver 116 electrically couples between the output end 114 and the display panel 118, and generates a driving signal 170 according to the bit values D1~D8. The gate driver 120 is electrically coupled to the display panel 118, and outputs an enable signal 180 to the display panel 118, so that the display panel 118 can receive the driving signal 170, and display a brightness that corresponds to the grayscale value (for example, the grayscale values 132-1-132-8) according to the driving signal 170. For example, the display panel 118 includes a first direction (such as the X direction) and a second direction (such as the Y direction). The driving signal 170 output by the source driver 116 is used to drive a plurality of pixels arranged in the same direction in the display panel 118 along one of the first direction and the second direction. The gate driver 120 outputs an enable signal 180 to the display panel 118, so that the pixels in the first row can display a brightness that corresponds to the grayscale value (for example, the grayscale value 132-1-132-8). Generally, the content of the gamma data source 102 can be a preset value, and can be manually adjusted according to actual needs. In some embodiments, the gamma data source 102, the signal receiving circuit 104, the buffer circuit 106, the counter 108, the multiplexer 110, the gamma processing units 112-1, 112-2, . . . , 112-8 of FIG. 1, and the output end 114 are located in a timing control (TCON) circuit, but the present disclosure is not limited thereto. The electronic device 100 in FIG. 1 is pre-selected by the multiplexer 110 and the counter 108, so that the gamma processing unit 112-1 does not need to receive the data in the entire gamma data source 102, and only needs to receive the bit message 150, the storage space required by the gamma processing unit 112-1 can be greatly saved.

Figure 2:
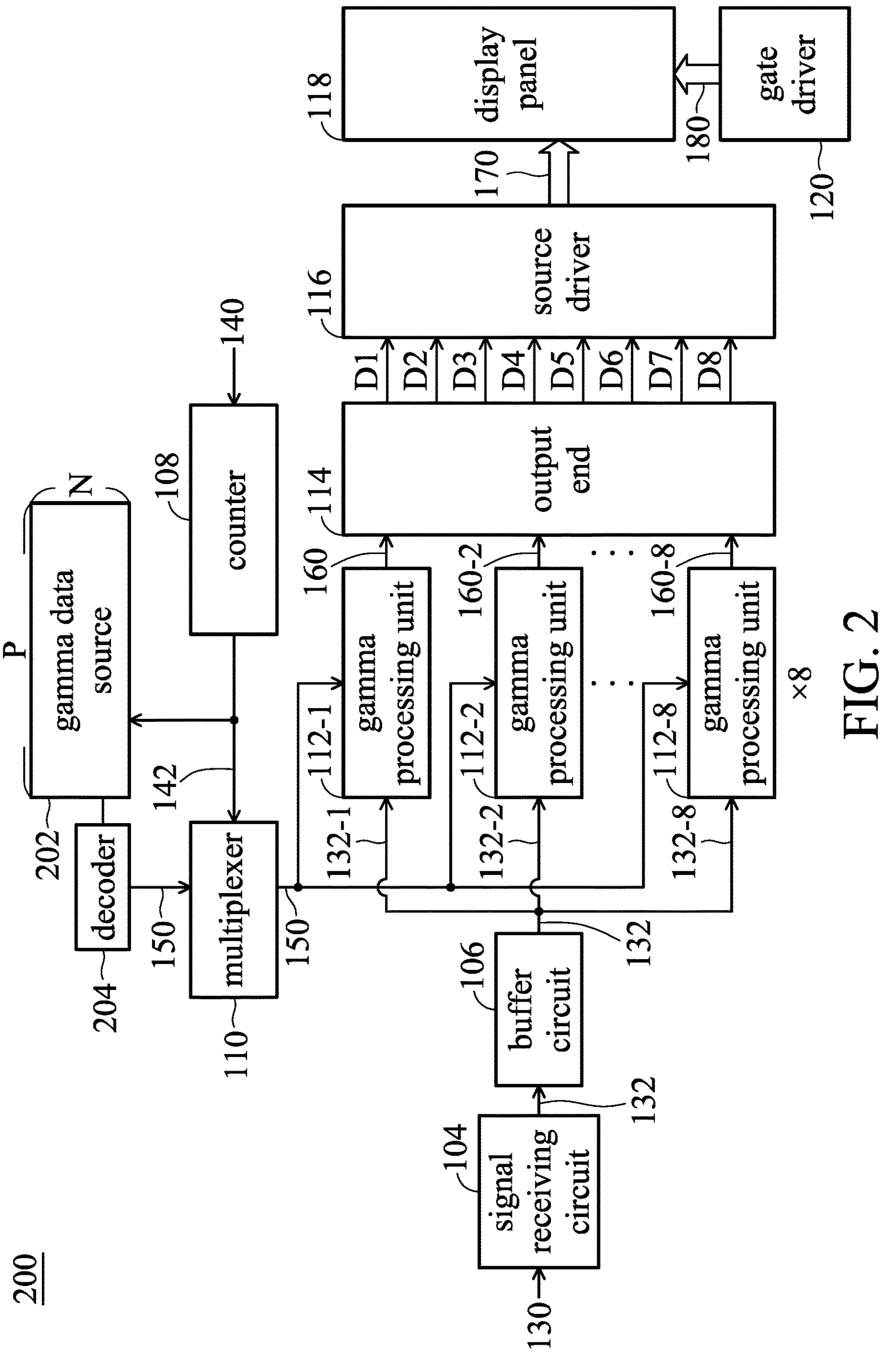
FIG. 2 is a schematic diagram of an electronic device 200 in accordance with some embodiments of the present disclosure.

FIG. 2 is a schematic diagram of an electronic device 200 in accordance with some embodiments of the present disclosure. It can be seen from the previous description that the gamma data source 102 in FIG. 1 includes multiple bit strings, and in respective bit string, the number of bits with a bit value of 0 is not necessarily the same as the number of bits with a bit value of 1. Therefore, the biggest difference between the electronic device 200 in FIG. 2 and the electronic device 100 in FIG. 1 is that the gamma data source 202 in FIG. 2 records the number of bits with a bit value of 0 and/or with a bit value of 1 corresponding to respective grayscale value under different grayscale values, instead of the original entire bit string composed of multiple 0s and 1s in the gamma data source 102 in FIG. 1. For example, in the previous embodiment, the gamma data source 102 in FIG. 1 corresponds to the bit string of the $0^{th}$ grayscale represented by $[1\ 1\ 1\ \ldots\ 1]^T$. However, in the gamma data source 202 in FIG. 2, it is recorded that there are 0 bits with a bit value of 0 and/or 64 bits with a bit value of 1 corresponding to the $0^{th}$ grayscale, that's all, but the recording method of the gamma data source 202 in the present disclosure is not limited thereto. In other words, in some embodiments, the gamma data source 202 may include a 7*16 (P*N in FIG. 2) matrix, where the latter "16" refers to 16 grayscale values, and the preceding "7" is to record the number of bits corresponding to a bit value of 0 or 1 under a specific grayscale in the form of a shorter bit string. For example, "0000001" means that the number of bits with a bit value of 1 is 1, "0100000" means that the number of bits with a bit value of 1 is 32, and so on. Since the gamma data source 102 is a 64-bit*16-bit matrix, the number of bits for the data in a row in the matrix may be 1, 2, 3, 4, . . . , or 64 bits of 1 and so on, that is a total of 65 variations. Therefore, the counter 108 uses a conversion parameter including 7 bits (there are 128 variations in total, but only 65 of them are used to represent the 65 brightness variations) to fully represent the above 65 variations. The present disclosure is not limited thereto.

Generally, take the gamma processing unit 112-1 as an example, the driving signal 170 output by the source driver 116 is related to the accumulation of the 64 bit values sequentially output by the gamma processing unit 112-1. In some embodiments, the higher the accumulated value of the 64 bit values 160 sequentially output by the gamma processing unit 112-1 is, the longer period the driving signal 170 output by the source driver 116 is at the high voltage. It is noted that if the display panel 118 is a reflective panel or an electronic paper display panel, the high voltage for a long time may make the time for the pixels of the display panel 118 to be in the light-penetrating state to be longer, and the time for the reflective state that can reflect the light is shortened, so the display brightness is lower. In contrast, a longer period of low voltage may shorten the time for the pixels of the display panel 118 to be in the light-penetrating state, and the time for the reflective state to reflect the light may be longer, so the display brightness is higher. A technical effect that can save storage space is achieved by converting the gamma data source 102 in FIG. 1 to the gamma data source 202. Correspondingly, the decoder 204 is electrically coupled to the gamma data source 202. The decoder 204 may include a conversion table for converting the data in the gamma data source 202 to obtain a conversion result, so that the multiplexer 110 can output the bit message 150 corresponding to the sequence number in the conversion result according to the sequence number 142 of the counter 108.

Table 2 is a schematic table of the multiplexer 110 correspondingly outputting different bit messages 150 according to the sequence number 142 from the counter 108.

TABLE 2

| Grayscale value | Sequence number 142 = 0 | . . . | Sequence number 142 = 6 | . . . | Sequence number 142 = 9 | . . . | Sequence number 142 = 63 |
|---|---|---|---|---|---|---|---|
| 0 | 1 | . . . | 1 | . . . | 1 | . . . | 1 |
| 1 | 0 | . . . | 1 | . . . | 1 | . . . | 1 |
| 2 | 0 | . . . | 0 | . . . | 1 | . . . | 1 |
| 3 | 0 | . . . | 0 | . . . | 0 | . . . | 1 |
| . . . | . . . | . . . | . . . | . . . | . . . | . . . | . . . |
| 14 | 0 | . . . | 0 | . . . | 0 | . . . | 1 |
| 15 | 0 | . . . | 0 | . . . | 0 | . . . | 0 |

As shown in Table 2, when the sequence number 142 from the counter 108 is equal to 0, the gamma data source 202 receives the sequence number, and provides corresponding data to the decoder 204 according to the sequence number, and the decoder 204 converts the data from the gamma data source 202 to obtain a conversion result, so that the multiplexer 110 can select and output the bit message 150 (such as $[1\ 0\ 0\ 0\ 0\ \ldots\ 0]^T$) corresponding to the sequence number 142 being 0 from the conversion result. When the sequence number 142 from the counter 108 is equal to 6, the decoder 204 converts the gamma data source 202 according to the conversion table, so that the multiplexer 110 can select and output the bit message 150 (such as $[1\ 1\ 0\ 0\ 0\ \ldots\ 0]^T$ corresponding to the sequence number 142 being 6 from the conversion result, and so on. The content of the matrix in Table 2 is an example, not a limitation of the present disclosure. In some embodiments of the FIG. 2, the operations of other components of the electronic device 200 are the same as those of the electronic device 100, and thus will not be repeated herein.

Figure 3:
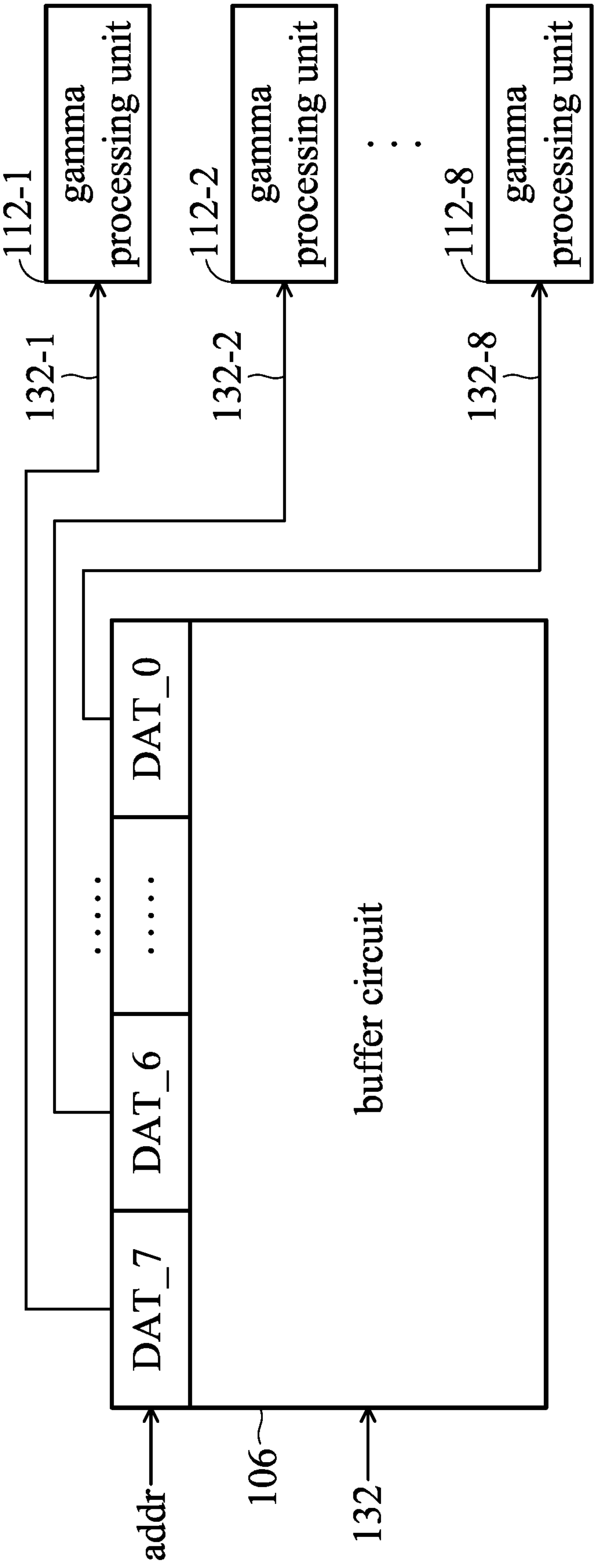
FIG. 3 is a schematic diagram of a buffer circuit 106 in the electronic device 100 in FIG. 1 and the electronic device 200 in FIG. 2 storing a grayscale value 132 in accordance with some embodiments of the present disclosure.

FIG. 3 is a schematic diagram of a buffer circuit 106 in the electronic device 100 in FIG. 1 and the electronic device 200 in FIG. 2 storing a grayscale value 132 in accordance with some embodiments of the present disclosure. As shown in FIG. 3, after the buffer circuit 106 receives the grayscale value 132 from the signal receiving circuit 104, since the electronic devices 100 and 200 includes 8 gamma processing units (such as gamma processing units 112-1, 112-2, . . . , 112-8) for simultaneously processing 8 pixels, the buffer circuit 106 sequentially stores grayscale values corresponding to the 8 pixels in an address addr. For example, the buffer circuit 106 stores the grayscale value 132-1 of the gamma processing unit 112-1 in a storage space DAT_7 in the address addr, stores the grayscale value 132-2 of the gamma processing unit 112-2 in a storage space DAT_6 in the address addr, and stores the grayscale value 132-3 of the gamma processing unit 112-3 in a storage space DAT_5 in the address addr, and so on. In some embodiments, the size of the storage spaces DAT_7~DAT_0 may all be 4 bits, but the present disclosure is not limited thereto.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:

a gamma data source;

a signal receiving circuit, configured to receive source data, and correspondingly generate a grayscale value;

a buffer circuit, electrically coupled to the signal receiving circuit, configured to store the grayscale value;

a counter, configured to receive a system clock signal to generate a sequence number;

a multiplexer, electrically coupled to the counter and the gamma data source, configured to receive the sequence number and output a bit message corresponding to the sequence number in the gamma data source; and a gamma processing unit, electrically coupled to the multiplexer and the buffer circuit, configured to receive the bit message from the multiplexer and receive the grayscale value from the buffer circuit, and to output a bit value corresponding to the grayscale value in the bit message.

2. The electronic device as claimed in claim 1, wherein the gamma data source comprises a matrix having M columns and N rows, and M and N are natural numbers greater than 1.

3. The electronic device as claimed in claim 2, wherein the grayscale value is an integer greater than or equal to 0 and less than N.

4. The electronic device as claimed in claim 2, wherein the sequence number is an integer greater than or equal to 0 and less than M.

5. The electronic device as claimed in claim 1, wherein the gamma data source is electrically coupled to a decoder; and the decoder is configured to convert data provided by the gamma data source to obtain a conversion result, so that the multiplexer outputs the bit message corresponding to the sequence number in the conversion result.

6. The electronic device as claimed in claim 1, further comprising an output end, wherein the output end is electrically coupled to the gamma processing unit, and is configured to receive the bit value and output the bit value.

7. The electronic device as claimed in claim 6, further comprising a source driver, wherein the source driver is electrically coupled to the output end, and is configured to generate a driving signal according to the bit value.

8. The electronic device as claimed in claim 7, further comprising a display panel, wherein the display panel is electrically coupled to the source driver, and is configured to receive the driving signal.

9. The electronic device as claimed in claim 8, further comprising a gate driver, wherein the gate driver is electrically coupled to the display panel, and is configured to output an enable signal to the display panel, so that the display panel displays a brightness corresponding to the grayscale value according to the driving signal.

10. The electronic device as claimed in claim 6, wherein the gamma data source, the signal receiving circuit, the buffer circuit, the counter, the multiplexer, the gamma processing unit, and the output end are located in a timing control (TCON) circuit.

11. The electronic device as claimed in claim 1, wherein the bit message is a matrix having one column and N rows, and N is a natural number greater than 1.

12. The electronic device as claimed in claim 11, wherein the bit message sequentially records bit values corresponding to respective grayscale values.

13. The electronic device as claimed in claim 11, wherein N is dependent on the number of grayscale stages.

14. The electronic device as claimed in claim 1, wherein respective row of the gamma data source corresponds to different grayscale values, and the respective row of the gamma data source records a bit string corresponding to the grayscale value.

15. The electronic device as claimed in claim 14, wherein the bit string corresponding to the grayscale value comprises different numbers of bit combinations of 0 and 1, and the bit combinations in the bit string represent a voltage effect that a pixel receives in a short period of time.

16. The electronic device as claimed in claim 15, wherein the bit string represents the length of time that the voltage effect is applied to the pixel within a display period.

17. The electronic device as claimed in claim 1, wherein after the buffer circuit receives grayscale values corresponding to multiple pixels from the signal receiving circuit, the buffer circuit sequentially stores the grayscale values corresponding to the pixels in an address.

18. The electronic device as claimed in claim 17, wherein the address comprises multiple storage spaces, and the storage spaces correspond to the respective pixels.

19. The electronic device as claimed in claim 18, wherein the size of the respective storage spaces is 4 bits.

20. The electronic device as claimed in claim 1, wherein the sequence number is represented by 6 bits.

* * * * *